Sept. 4, 1934.     P. E. BARKER     1,972,581
BEARING
Filed Oct. 26, 1931

Inventor
Percy E. Barker
By Edwin F. Sammule
Attorney

UNITED STATES PATENT OFFICE 1,972,581

BEARING

Percy E. Barker, Towson, Md., assignor to The Black & Decker Manufacturing Company, Towson, Md., a corporation of Maryland Application October 26, 1931, Serial No. 570,991

7 Claims. (Cl. 308—184)

In accordance with the existing practice regarding the mounting of rotating shafts on ball bearings, the rotor shaft of an electric motor being a convenient example, the outer race of one bearing is held rigid in the bearing housing into which it is ordinarily pressed or forced, while the other bearing is left free to slide, i. e., in the direction of the axis, to take up expansion and contraction of the shaft, the outer race having what is known as a sucking fit in the seat or housing.

In the manufacture of these parts absolute accuracy is impossible. In the manufacturing practice there are therefore certain tolerances or variations permitted in machining as to the diameter of the seat and the outer diameter of the outer race, and under certain conditions as when the inside diameter of the seat is near the upper limit and the outside diameter of the outer race is near the lower limit, the engagement of the outer race with the seat is apt to be so loose that the outer race rotates with the inner race and ball retaining cage and shaft so that some of the parts actually within the proper inspection limits cannot be used satisfactorily together.

The object of the present invention is to make it feasible to use all bearings and seats within the regular tolerances and to even increase the tolerance as to the diameter of the seat bore and the outside diameter of the outer race in the direction of the maximum diameter of the former and the minimum diameter of the latter or to otherwise vary or increase the difference between the diameter of the race and seat, and still establish a relation of the parts which has all the advantages of the sucking fit required by the previously existing practice.

In accordance with the invention the outer race is held in the seat by means of rubber or similar blocks or other resilient means compressible in a radial direction. These preferably engage the outer race at points suitably spaced along its circumference and are slightly compressed in contact with the race. The rubber contacting with the outside of the race has a dragging action which prevents the race from rotating and at the same time allows it to move in the direction of the axis with sufficient freedom to take up the expansion and contraction of the shaft, eliminating any tendency to cramp the bearings on account of such contraction and expansion, and in case the bearing race starts, as it may, to creep or rotate very slowly, a certain amount of rubber will be deposited on its surface and accumulate between the surface of the race and the housing bore tending to assist the rubber supports in holding the race against rotation.

By virtue of the invention the necessity for the sucking fit of the race in the seat which is a matter of some considerable expense, is in effect dispensed with, or made unnecessary, cheapening the product and facilitating its manufacture.

In the accompanying drawing I have illustrated a bearing support embodying the features of the invention in connection with so much of an electric motor equipped with the bearing support as is necessary to an understanding of the invention, and the method of applying the same.

Figure 1:
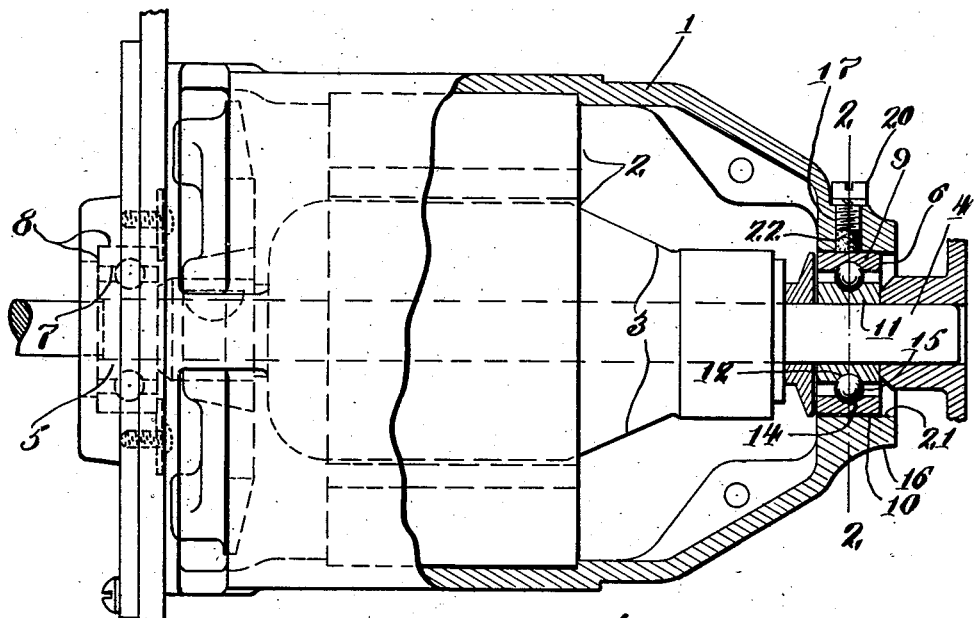
Figure 1 is an elevation partly in section of a motor housing and a motor equipped with the bearing support of the invention.
Figure 2:
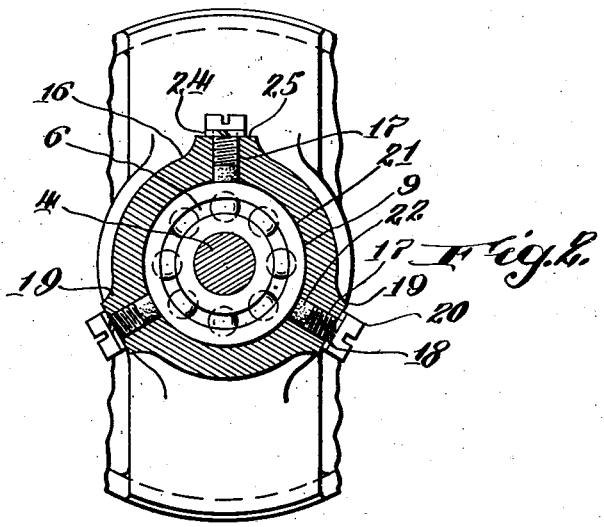
Figure 2 is a section on the line 2, 2 of Figure 1.

Referring to the drawing by numerals, each of which is used to indicate the same or similar parts in the different figures, the construction shown comprises a motor housing or frame 1, enclosing the motor 2 having a rotor 3 mounted in a shaft 4 which rotates in ball bearings 5 and 6, at each end. One bearing 5 is stationary and has its outer race 7 rigidly secured in the seat 8 into which it is forced or pressed. The other bearing 6, on the other hand, has its outer race 9 mounted to slide in the seat 10 in the direction of the axis of the shaft 4 to take up and provide for longitudinal expansion and contraction of the motor shaft 4 as its temperature rises and falls, it being understood that in accordance with the usual practice the inner race 11 is secured to the shaft 4 and the inner and outer races are provided with registering grooves 12 and 14, respectively, in which the balls 15 are seated so that the bearing balls 15 provide a connection between the inner and outer races and the shaft 4, causing the bearing to move or tend to move back and forth in the direction of the axis as the shaft expands which is the method whereby the contraction and expansion of the shaft are taken up by the sliding bearing which is the subject of the invention.

In accordance with the construction shown, the seat 10 for the sliding or floating bearing 6 is enclosed in a housing or boss 16 formed on the frame or motor housing 1.

This housing or boss 16 in the form of the invention shown is drilled or apertured radially or in any suitable manner at 17 with a plurality of holes extending from the outside of the boss 16 into the seat or cavity 10, there being three of said holes 17 in the form of the invention shown, spaced by arcs at 120 degrees. These bores or apertures 17 are suitably threaded at 18 and may be surrounded each by a boss at 19. A screw 20 inwardly disposed toward the bearing seat 21, is engaged with the thread in each opening or bore 17, each screw being preferably a little shorter than the distance from the top of the boss 19 to the outside of the outer ball race 9 and a small cylinder or block of live rubber 22 is placed in each bore or opening 17, between the end of the corresponding screw 20 and the outer surface of the outer ball race 9. The rubber cylinder or block being preferably of such a thickness that when the screw is inserted and tightened up against the lock washer 24 or the outer surface of the boss 25, there being preferably some sort of stop to position the screw, an appreciable pressure will be applied to the rubber cylinder.

The rubber thus contacting with the outside of the ball bearing race 9 tends to apply a dragging tendency to it which prevents the race from rotating but allows it to slide with sufficient freedom in the direction of the axis to take up or provide for the expansion and contraction of the shaft without causing cramping of the bearings 5, 6.

In case the outer race 9 starts to creep or rotate, a certain amount of rubber will be deposited on its surface and tend to accumulate between the surface of the race and the housing wall, thus contributing to the effect of the rubber cylinders in holding it against rotation.

Preferably the outer race is supported and guided by the seat, the friction member serving merely to prevent free rotation of the race at the same time permitting the race to yield longitudinally to provide for contraction and expansion of the shaft.

I have thus described specifically and in detail a bearing support particularly adapted to use with ball bearings, embodying the features of my invention in the preferred form in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. The combination with a ball bearing for a rotary shaft, the ball bearing having an inner and outer race with registering grooves and balls therein, of a seat for the outer race in which it is mounted to slide and in which it is rotatable, and yielding means in the form of relatively soft solid material in contact with the outer race and a plurality of members arranged to operate in radial directions and spaced along the periphery adapted to adjust the pressure on said soft material for applying friction to the outer race tending to restrain rotation of the outer race and permitting it to yield in the direction of the axis of the shaft.

2. The combination with a ball bearing for a rotary shaft, the ball bearing having an inner and outer race with registering grooves and balls therein, of a seat for the outer race in which it may rotate and in which it is mounted to slide, and adjustable means spaced about the periphery of the race to operate in a radial direction for applying friction to the outer race tending to prevent rotation of the outer race and permitting it to yield in the direction of the axis of the shaft said means for applying friction including a plurality of blocks of soft material in contact with the outer race and similarly spaced.

3. The combination with a ball bearing for a shaft having an inner and outer race with registering grooves and balls therein of a cylindrical seat for the outer race in which the race is mounted to slide and in which it may rotate, and yielding means comprising a pad of soft material engaging the race and an adjustable member engaging the pad in a radial direction for applying pressure to the outer surface thereof, tending to prevent rotation of the race and permitting it to yield in the direction of the axis of the shaft.

4. The combination with a ball bearing having inner and outer races with registering peripheral grooves and balls therein, the outer race having a full cylindrical peripheral surface a cylindrical seat for the outer race in which it is adapted to slide in the direction of the axis of the bearing and in which it is rotatable, said seat having threaded openings arranged in a substantially radial direction, yielding material in said openings engaging the outer race, checking the rotation thereof and permitting to to slide axially, and screws for applying pressure thereto, and abutments whereby the screws are positioned in said openings to determine the pressure.

5. The combination with a ball bearing for a rotary shaft having inner and outer races with registering grooves, and balls therein of a cylindrical seat concentric with the outer race, the seat having apertures with resilient blocks therein, and means for applying pressure to said blocks, said pressure being transmitted to the outer race to prevent rotation thereof, permitting it to yield in the direction of the axis of the bearing without cramping the bearing.

6. The combination with a ball bearing for a rotary shaft having inner and outer races with registering grooves and balls therein of a cylindrical seat concentric with the outer race, the seat having apertures with resilient blocks therein, and means for applying pressure to said blocks, said pressure being transmitted to the outer race to prevent rotation thereof and permitted to yield in the direction of the axis of the bearing without cramping the bearing, the pressure applying means being in the form of a screw engaging each block and an abutment for limiting the advance of the screw.

7. The combination with a ball bearing for a rotary shaft having inner and outer races with registering grooves and balls therein of a cylindrical seat concentric with the outer race, the seat having apertures with rubber blocks therein and means for applying pressure to said blocks, said pressure being transmitted to the outer race to prevent rotation thereof and permitted to yield in the direction of the axis of the bearing without cramping the bearing, the pressure applying means being in the form of a screw engaging each block and an abutment for limiting the advance of the screw, the threaded apertures being spaced by substantially equal arcs about the circumference of the seat.

PERCY E. BARKER.